(No Model.)  2 Sheets—Sheet 1.
E. P. WARNER.
MINING DRILL.
No. 511,869. Patented Jan. 2, 1894.
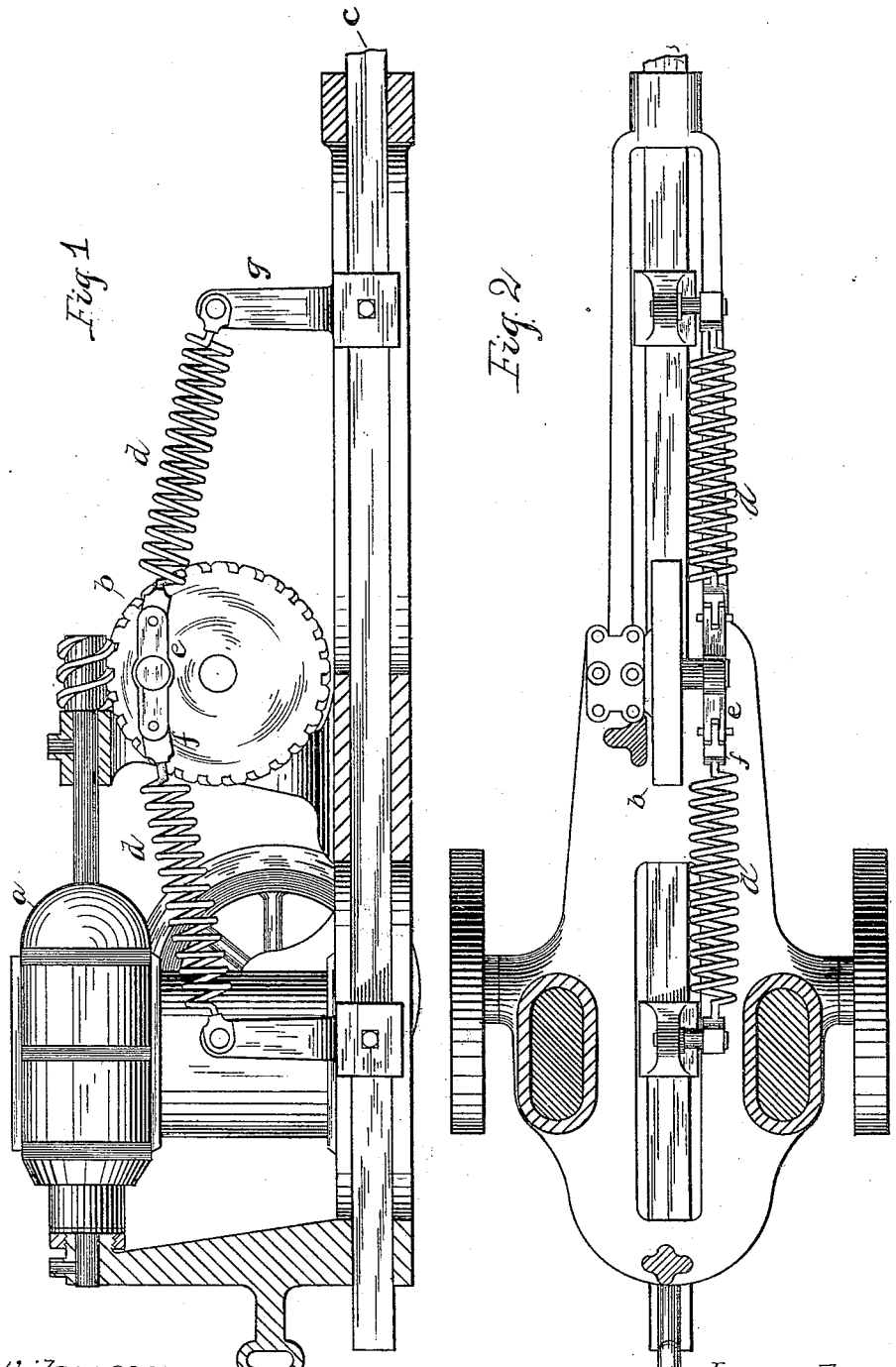
Witnesses
George L. Cragg
Ella Edler.
Inventor,
Ernest P. Warner.
By George P. Barton
Atty (No Model.) 2 Sheets—Sheet 2.
E. P. WARNER.
MINING DRILL.
No. 511,869. Patented Jan. 2, 1894.
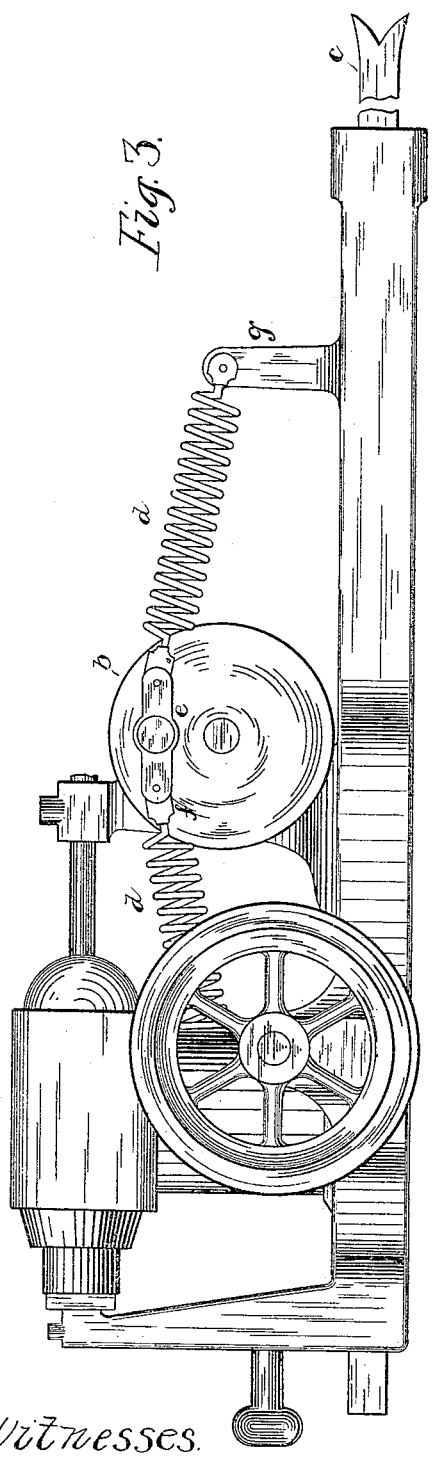
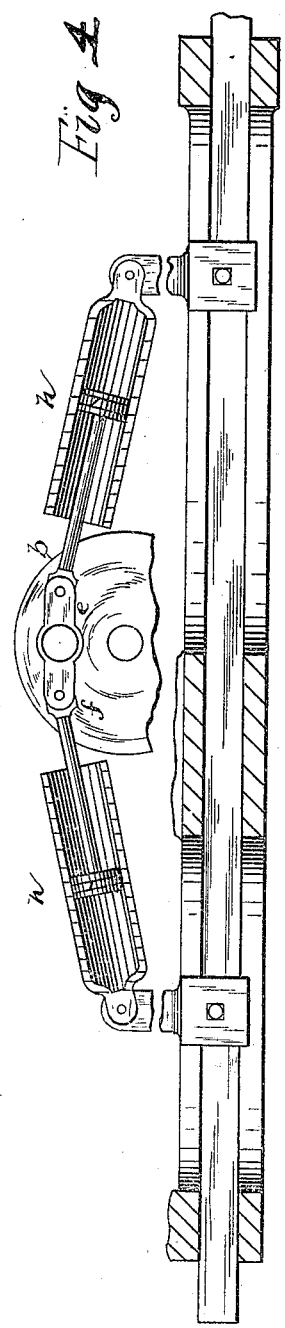
Witnesses.
George L. Cagg
Ella Edler
Inventor.
Ernest P. Warner.
By George P. Barton,
Atty

UNITED STATES PATENT OFFICE.

ERNEST P. WARNER, OF CHICAGO, ILLINOIS, ASSIGNOR TO THE WESTERN ELECTRIC COMPANY, OF SAME PLACE.

MINING-DRILL.

SPECIFICATION forming part of Letters Patent No. 511,869, dated January 2, 1894.

Application filed February 16, 1891. Serial No. 381,700. (No model.)

*To all whom it may concern:*

Be it known that I, ERNEST P. WARNER, a citizen of the United States, residing at Chicago, in the county of Cook and State of Illinois, have invented a certain new and useful Improvement in Mining-Drills, of which the following is a full, clear, concise, and exact description, reference being had to the accompanying drawings, forming a part of this specification.

My invention relates to picks or drills for mining or quarrying, and its object is to provide yielding connections between the motor and the reciprocating bar forming the pick in order that irregularities in position of the bar to the work may not interfere with its efficient operation. In this manner I am enabled to cause the pick or drill to be thrust forward to the work in rapid reciprocating strokes, notwithstanding the distance of the machine from the work being done varies. These machines are intended to be moved forward by hand and consequently the rate of movement of the machine will not be precisely uniform with the rate of cutting, but by providing the yielding connection for the drill such irregularities in moving the machine forward are compensated or balanced so as to prevent any objectionable shocks upon the drill or machine.

I have constructed my machine to be driven by an electric motor, though it is evident that any other well known means may be employed for imparting movement to the main driving shaft or wrist plate. The yielding connection may consist of coiled springs or of pneumatic springs.

In the accompanying drawings which are illustrative of my invention—Figure 1 is a side elevation of my drilling machine partially in section. Fig. 2 is a plan view thereof with the electric motor removed. Fig. 3 is a side elevation of my machine. Fig. 4 is a modification showing a pneumatic spring in place of the coiled spring.

Like parts are indicated by similar letters of reference throughout the different figures.

The electric motor $a$ or other source of power may be geared or otherwise connected with the wrist plate $b$. The drill $c$ consists of a bar working in suitable guides and extending forward a suitable distance. This pick or drill $c$ is reciprocated back and forth, striking its point each time it is thrust forward against the clay, coal or rock as the case may be. It is well known in the art that when desired a reciprocating pick may be also rotated and I have not therefore deemed it necessary to show the means for accomplishing such rotary movement.

The machine which I have illustrated is designed more especially for under cutting coal; hence no rotary movement of the drill or bar is required.

It is by means of the yielding connections $d$ between the wrist $e$ and the reciprocating drill that the desired freedom of action of the drill is effected. These springs are connected with an arm $f$ turning freely upon the wrist $e$ as shown, and also with the standards $g$ clamped to the bar $c$. Now as the wrist plate is rotated a reciprocating movement is imparted to the bar $c$. The momentum of the bar $c$ as it is thus reciprocated may cause its length of stroke to somewhat exceed the distance over which the wrist is moved back and forth owing to the yielding connection afforded by the spring $d$. In this way the point of the drill will be caused to strike against the substance which is being cut away without requiring that nicety of adjustment of position of the machine with respect to the work that would be required in case there were no such yielding connection.

In Fig. 4 I have shown pneumatic springs $h$ which may be used instead of the coiled springs $d$ of Figs. 1, 2, 3 and 4.

It will be readily understood that by making one of the springs $d$ strong enough to act in both directions the other spring may be dispensed with, but in practice I have found two springs preferable. The same may be said of the pneumatic springs $h$. I therefore do not limit myself to the details of construction shown since any suitable yielding connection interposed between the reciprocating drill and the motor for driving the same may be employed with the desired result, provided at all times the yielding connection is maintained between the motor and the reciprocating drill.

Having thus described my invention, I claim as new and desire to secure by Letters Patent—

1. In a drilling machine, the combination with the motor, of a crank driven by said motor, a reciprocating drill, and springs each having one end connected with said reciprocating drill and the other end connected with said crank pin, substantially as described.

2. In a drilling machine the combination, with a motor, of a crank driven thereby, having its wrist $e$ connected by springs $d\ d$ to the drill bar $c$, whereby reciprocating motion is given the said bar, substantially as and for the purpose specified.

In witness whereof I hereunto subscribe my name this 12th day of January, A. D. 1891.

ERNEST P. WARNER.

Witnesses:
ELLA EDLER,
GEORGE L. CRAGG.